United States Patent
Kristjansson et al.

(10) Patent No.: US 9,430,800 B2
(45) Date of Patent: Aug. 30, 2016

(54) METHOD AND APPARATUS FOR TRADE INTERACTION CHAIN RECONSTRUCTION

(71) Applicant: NICE-SYSTEMS LTD, Ra'anana (IL)

(72) Inventors: Gudmundur Kristjansson, Alkmaar (NL); Daniël te Winkel, Obdam (NL); Moshe Wasserblat, Makabim (IL); Cromwell Fraser, Kent (GB); Steve Logalbo, Lagrangeville, NY (US); Bastiaan Schönhage, Amsterdam (NL); Bram Nachtegaal, Koog aan de Zaan (NL); Yaron Morgenstern, London (GB); Jeroen Vink, Alkmaar (NL); Oren Pereg, Amikam (IL)

(73) Assignee: NICE-SYSTEMS LTD, Ra'Anana (IL)

( * ) Notice: Subject to any disclaimer, the term of this patent is extended or adjusted under 35 U.S.C. 154(b) by 528 days.

(21) Appl. No.: 13/713,009

(22) Filed: Dec. 13, 2012

(65) Prior Publication Data
US 2014/0172859 A1 Jun. 19, 2014

(51) Int. Cl.
*G06F 17/30* (2006.01)
*G06Q 40/04* (2012.01)

(52) U.S. Cl.
CPC .................................. *G06Q 40/04* (2013.01)

(58) Field of Classification Search
CPC ...... G06Q 40/04; G06Q 40/06; G06Q 40/00; G06Q 30/06; G06Q 40/02; G06Q 10/087; G06Q 30/0222; G06Q 40/025; G06Q 40/08; G06Q 20/023; G06Q 20/027; G06Q 30/0253; G06Q 30/08; G06Q 50/188; G06Q 20/401; G06Q 20/4016; G06Q 10/06316; G06Q 30/0255; G06Q 30/0611; G06N 5/04; Y10S 707/95; G06F 17/30386; H04L 12/1804

USPC .......... 705/37, 38, 35, 4, 301, 341; 707/740
See application file for complete search history.

(56) References Cited

U.S. PATENT DOCUMENTS

| | | | |
|---|---|---|---|
| 7,899,871 B1 * | 3/2011 | Kumar et al. ................ 709/206 |
| 2006/0010217 A1 * | 1/2006 | Sood ........................ H04L 51/12 709/206 |
| 2008/0065524 A1 * | 3/2008 | Matthews et al. .............. 705/37 |
| 2009/0106375 A1 * | 4/2009 | Carmel .................. G06F 17/279 709/206 |
| 2010/0082495 A1 * | 4/2010 | Lutnick ................ G06Q 50/188 705/80 |
| 2011/0035681 A1 * | 2/2011 | Mandel ................ G06Q 10/107 715/752 |
| 2011/0206198 A1 * | 8/2011 | Freedman .............. G06Q 30/06 379/265.03 |

* cited by examiner

*Primary Examiner* — Evan Aspinwall
(74) *Attorney, Agent, or Firm* — Soroker Agmon Nordman (57) ABSTRACT

The subject matter discloses a method for trade interaction chain reconstruction comprising: identifying a swap deal, the swap deal includes two or more of the received interactions and involves two or more participants; selecting a first interaction of the received interactions, said first interaction involves at least two participants of the two or more participants, said first interaction is stored on a computerized device; obtaining a first plurality of interactions of the received interactions that involve the at least two participants of the two or more participants; determining a first plurality of relevance scores between the first plurality of interactions and the first interaction; and associating interactions of the first plurality of interactions to be relevant to the swap deal according to the determined first plurality of relevance scores.

21 Claims, 10 Drawing Sheets

| [300] DETECTED WORD | [320] TIME TAG[MS], ORDINAL POSITION |
|---|---|
| [302] TRADE | [330] 1500, 3 |
| [304] BOND | [332] 2150, 4 |
| [306] INTEREST | [334] 2450, 5 |
| . | . |
| . | . |
| . | . |
| [308] CLOSE | [336] 2880, 6 |

FIG. 3A

| [340] RECOGNIZED ENTITY, | [350] RECOGNIZED ENTITY TYPE | [360] TIME TAG[MS], ORDINAL POSITION |
|---|---|---|
| [342] GOOGLE | [352] COMPANY | [362] 5700, 16 |
| . | . | . |
| . | . | . |
| . | . | . |
| [344] MILLION DOLLARS | [354] MONETARY VALUE | [364] 34300, 35 |

FIG. 3B

| | [400] WORDS/ENTITIES | [420] INTERACTION ID, (TIME TAG[MS], ORDINAL POSITION) | | ... | |
|---|---|---|---|---|---|
| WORDS | [402] TRADE | [430] 101, 1500, 3 | | ... | [446] 155, 17430, 23 |
| | [404] BOND | [432] 101, 2150, 4 | [438] 131, 23850, 48 | ... | [448] - |
| | [406] INTEREST | [434] 101, 2450, 5 | [440] 125, 32600, 64 | ... | [450] - |
| | | | [442] - | ... | |
| | [408] CLOSE | [436] 101, 2880, 6 | [444] 109, 48500, 85 | ... | [452] 153, 29760, 41 |
| | [410] GOOGLE | [460] 236, 5700, 16 | [464] 305, 88000, 98 | ... | [468] 406, 54000, 76 |
| ENTITIES | [412] MILLION DOLLARS | [462] 573, 34300, 35 | [466] - | ... | [470] - |
| | [414] COMPANY | [472] 236, 5700, 16 | [476] 573, 34300, 35 | ... | [480] - |
| ENTITY TYPES | [416] MONETARY VALUE | [474] 943, 96300, 135 | [478] - | ... | [482] - |

FIG. 4

| [518] METADATA/CATEGORY | | [520] INTERACTION ID | | | |
|---|---|---|---|---|---|
| | | [522] 101 | [524] 102 | ... | [526] N |
| METADATA | [500] TRADER ID | [530] 72300 | 55375 | ...... | 72300 |
| | [502] COUNTER PARTY ID | 43526 | 36400 | ...... | 43526 |
| | [504] ORDER ID | - | 5243691391 | ...... | 5015687154 |
| | [506] EXECUTION ID | - | 43673734 | ...... | 34216876 |
| | [508] SWAP ID | [540] 75 | 0 | ...... | - |
| CATEGORY | [510] EXECUTION | 80 | 50 | ...... | 90 |
| | [512] SWAP | | | | 85 |
| | [514] NEGOTIATION | 0 | 90 | ...... | 0 |

| | | REFERENCE INTERACTION/CORPUS FEATURE VALUES[800] | I-TH INTERACTION FEATURE VALUES OF INTERACTIONS LIST [802] |
|---|---|---|---|
| WORDS/ PHRASES | [810] TRADE [812] MORTGAGE BUNDLE [814] SWAP DEAL | [818] 0.92 [820] 0.21 [822] 0.67 | [826] 1 [828] 0 [830] 1 |
| | [816] DEAL CLOSED [840] AIG | [824] 0.13 [844] 0.1 | [832] 0 [848] 0 |
| ENTITIES | FIFTY MILLION DOLLARS [860] SWAP | [846] 0.87 [862] 0.92 | [850] 1 [868] 0.78 |
| CATEGORY | EXECUTION NEGOTIATION | [864] 0.32 [866] 0.56 | [870] 0.11 [872] 0.88 |

RECONSTRUCTION — 1000

- ☒ Email at 7/3/2001 7:04:51 PM — 1002
  RE: PMA'S
  fran.chang@enron.com to
- ☒ Email at 7/3/2001 10:58:51 PM
  RE: PMA'S
  fran.chang@enron.com to
- ☒ Email at 7/3/2001 8:48:51 PM
  RE: PMA'S
  virginia.thompson@enron.com to
- ☒ Email at 7/3/2001 3:32:45 PM
  RE: PMA'S
  bill.williams@enron.com to
- ☒ Email at 7/3/2001 10:54:51 PM
  RE: PMA'S
  kate.symes@enron.com to
- ☒ Email at 7/3/2001 6:31:00 PM
  RE: PMA'S
  bill.williams@enron.com to
- ☒ Email at 7/3/2001 1:54:51 AM
  RE: PMA'S
  virginia.thompson@enron.com to
- ☒ Email at 7/3/2001 11:02:45 PM
  RE: PMA'S

SCENARIO — EMAIL INTERACTION fran.chang@enron.com to bill.williams@enron.com and 1 more 7/3/2001 7:05:51 PM

1004
FROM: fran.chang@enron.com
TO: fran.chang@enron.com
TYPE: Email

SUBJECT: RE:PMA's — 1006

Virginia and Bill:

During our month-end processes I have researched deal #549162.1. The counterparty did change as Bill pointed out, but what makes you suffer a loss in the prior month adjustments was due to the volume being zeroed out for HE 3. Originally the deal liquidated with HE3 (40MWh*$135), He4(15MWh*135) & He5(20MWh*135), but on 4/19/2001 the volume for HE3 was zeroed out in scheduling, which means originally you were given too much $ for the sale and therefore we are now taking that revenue you made in HE3 back.

Thanks,
Fran
x7973

-----Original Message-----
From: Williams III, Bill
Sent: Tues, July 03, 2001 6:31AM
To: Thomson, Virginia
Cc: Duton, Heather, Chang, Fran

METHOD AND APPARATUS FOR TRADE INTERACTION CHAIN RECONSTRUCTION

FIELD OF THE INVENTION

The present invention relates to interaction analysis in general, and to a method and apparatus for trade interaction chain reconstruction, in particular.

BACKGROUND

Large financial organizations conduct numerous audio and textual interactions with customers, traders, insurance agents or other persons on a daily basis. Some of these interactions are vocal, or at least comprise a vocal component, such as an audio part of a video or face-to-face interaction; and some of these interactions are textual, such as emails, chat sessions, instant messaging sessions, or social media correspondence.

Many of the interactions relate to trade deals and in particular to swap trade deals between two or more parties. Many trade deals and in particular swap trade deals are negotiated and finally settled across an interaction chain. An interaction chain contains multiple vocal and/or textual interactions conducted within a certain time interval. An interaction chain may involve more than two parties. For example, an interaction chain that relate to a credit default swap (CDS) deal may involve two trading parties and at least one insuring party for insuring the CDS deal contract.

Many organizations record some or all of the interactions, whether it is required by law or regulations, or for any other reason. Once the interactions are recorded, the organization may want to be able to retrieve an interaction or an interaction chain that relate to a particular trade deal or swap trade deal. Moreover, according to Dodd-Frank Wall Street reform and customer protection act regulations, there is a need for "comprehensive and accurate trade reconstructions".

Interaction recording solutions today provide a very limited solution to the interaction chain retrieval problem.

There is thus a need in the art for method and apparatus for trade interaction chain reconstruction.

SUMMARY OF THE INVENTION

A trade interaction chain reconstruction system and method is disclosed which receives vocal and/or textual trade interactions. The system includes two components: a preprocessing component and an interaction chain reconstruction component. The preprocessing component includes:

receiving a textual or audio interaction; automatic transcription of the received audio interaction; performing information extraction such as word/phrase detection and entity recognition on the received textual interaction or on the transcription of the received audio interaction. The extracted information may be indexed in an inverted index. In addition, the preprocessing component includes metadata association to the received textual or audio interaction and categorization of the received textual or audio interaction. The associated metadata and the categorization product may be stored is a database.

The interaction chain reconstruction component performs searching and retrieving for an anchor interaction in an interaction recording system. An anchor interaction may be a single interaction that is a part of an interaction chain that needs to be reconstructed. The anchor interaction may be searched by using search criteria parameters such as detected words or phrases, recognized named entities, interactions associated metadata such as interaction recording/capturing date and time or the like. The search process may yield a list of interactions. The list of interactions may be sorted according to the matching level of each interaction on the list to the search criteria.

The preprocessing component further performs selecting an anchor interaction from the list of interactions.

Determining a relevance score between the selected anchor interaction and other recorded interactions; and generating a relevant list of interactions that are associated with a high relevance score to the selected anchor interaction. The relevant list of interactions includes interactions that are likely to be part of the trade interaction chain. The relevance score determination may be based on a similarity measure function. Similarity measure function measures the similarity between two interactions, typically, between the anchor interaction and one recorded interaction. The similarity measure function may include parameters such as: the level of similarity between words/phrases that are detected in both interactions, the level of similarity between recognized entities in both interactions, the level of similarity between the category scores that are associated to both interactions, the level of similarity between the metadata that is associated to both interactions and the like;

The relevant list of interactions is used for determining the interactions that constitute the trade interaction chain. In some embodiments, the determination may be performed by a human user that may listen to the audio interactions and/or read the textual interactions on the relevant list of interactions. The human user may decide to select one or more interactions upon evidencing expressions that associate the interaction as being part of the specific trade interaction chain. In other embodiments the interactions selection may be performed automatically, for example by automatic selection of the top relevance scored interactions on the relevant list of interactions.

BRIEF DESCRIPTION OF THE DRAWINGS

The present disclosure will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 11 shows a display application of interaction chain determination according to exemplary embodiments of the disclosed subject matter.

DETAILED DESCRIPTION

Figure 1:
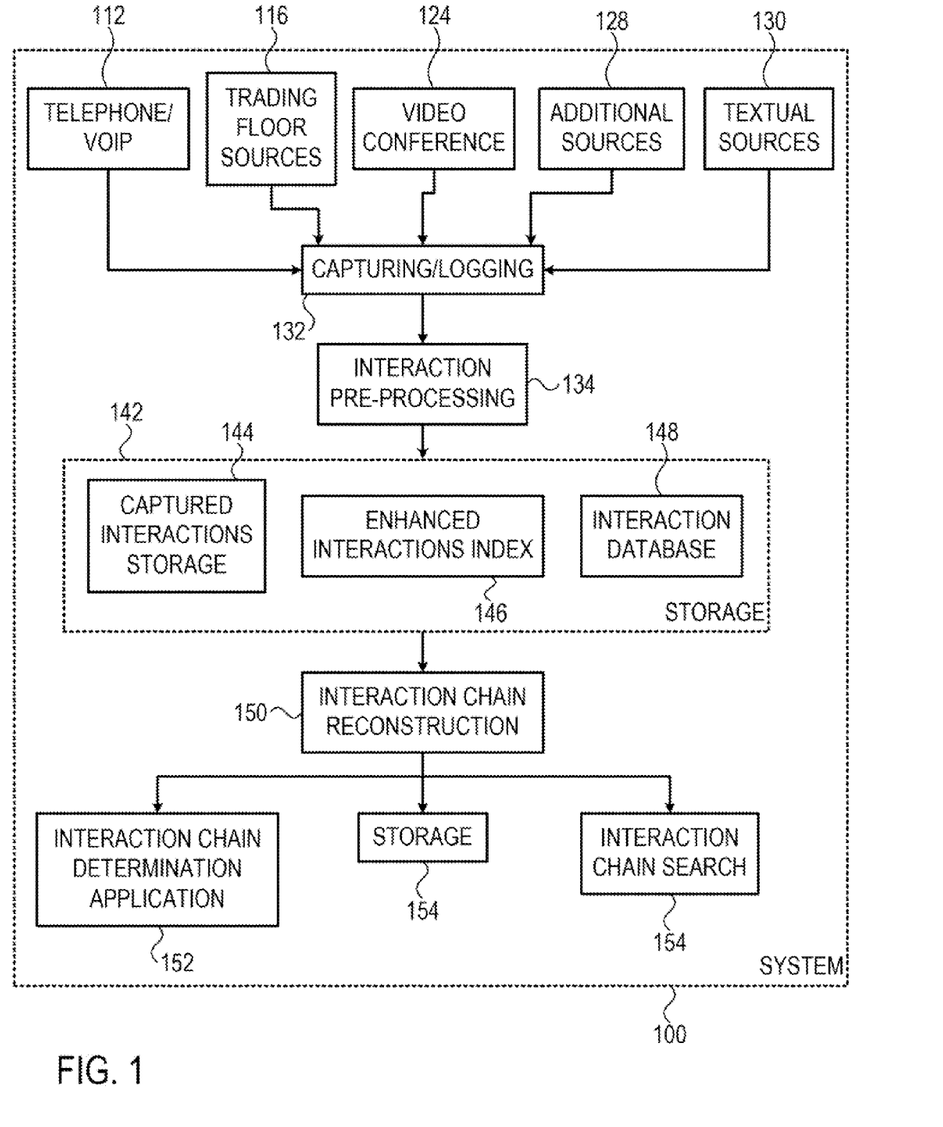
FIG. 1 shows a typical environment in which the disclosed method is used, according to exemplary embodiments of the disclosed subject matter.

Reference is made to FIG. 1 which shows a system 100 which is an exemplary block diagram of the main components in a typical environment in which the disclosed method is used, according to exemplary embodiments of the disclosed subject matter;

As shown, the system 100 may include a capturing and/or logging module 132 that may receive input from various sources, such as telephone/VoIP 112, trading floor sources 116, video conference 124, additional sources 128 or textual sources 130. It will be understood that the capturing and logging module 132 may receive any digital input produced by any component or system, e.g., any recording or capturing device. For example, any one of a microphone, a computer telephony integration (CTI) system, a private branch exchange (PBX), a private automatic branch exchange (PABX), an email server system, a chat server system, a social media capture system or the like may be used in order to capture audio signals or textual data.

As further shown, the system may include an interaction pre-processing component 134, a storage device 142 that stores enhanced interaction index 146 and interaction database 148. It also includes an interaction chain reconstruction component 150. As shown, the output of the system may be provided to interaction chain determination application 152 and/or to interaction chain storage module 154 and/or to interaction chain search module 156.

A typical environment where a system according to the invention may be deployed may be an interaction-rich organization, e.g., a contact center, a bank, a trading floor, an insurance company or any applicable financial or other institute. Interactions captured and provided to the system 100 may be any applicable interactions or transmissions, including interactions with customers or users or interactions involving organization members, suppliers or other parties.

Various data types may be provided as input to the system 100. The information types optionally include auditory segments, video segments, textual segments, and additional data. The capturing of voice interactions, or the vocal or auditory part of other interactions, such as video, may be of any form, format, and may be produced using various technologies, including trunk side, extension side, summed audio, separate audio, various encoding and decoding protocols such as G729, G726, G723.1, and the like.

The interactions may be provided by modules telephone/VoIP 112, trading floor sources 116, video conference 124, additional sources 128 and textual sources 130 and captured by the capturing/logging module 132. Audio interactions may include telephone or voice over IP (VoIP) sessions, telephone calls of any kind that may be carried over landline, mobile, satellite phone or other technologies. It will be appreciated that voice messages are optionally captured and processed as well, and that embodiments of the disclosed subject matter are not limited to two-sided conversations. Captured interactions may include interactions performed using trading floor communication systems such as trading turret systems or dealer board systems as shown by the trading floor sources module 116. Captured interactions may also include face to-face interactions, such as those recorded in a walk-in-center, video conferences that include an audio component or any additional sources of data as shown by the additional sources module 128. The additional sources module 128 may include vocal sources such as microphone, intercom, vocal input by external systems, broadcasts, files, streams, or any other source. The textual sources module 130 may include sources such as e-mails, chat sessions, instant messaging sessions, social media sessions, facsimiles which may be processed by, for example, Object Character Recognition (OCR) systems and the like.

Data from all the above-mentioned sources and others may be captured and/or logged by the capturing/logging module 132. The capturing/logging module 132 may include a computing platform that may execute one or more computer applications, e.g., as detailed below. The captured data may optionally be stored in captured interactions storage 144. The captured interactions storage 144 is preferably a mass storage device, for example an optical storage device such as a CD, a DVD, or a laser disk; a magnetic storage device such as a tape, a hard disk, Storage Area Network (SAN), a Network Attached Storage (NAS), or others; a semiconductor storage device such as Flash device, memory stick, or the like.

The storage may be common or separate for different types of captured segments of an interaction and different types of additional data. The storage may be located onsite where the segments or some of them are captured, or in a remote location. The capturing or the storage components can serve one or more sites of a multi-site organization.

In an embodiment, the interaction pre-processing component 134 processes a textual interaction or a transcription of an audio interaction, associates the processed information with the interaction and stores the processed information in storage 142. The pre-processing component 134 may include information extraction such as word/phrase detection and entity recognition from the processed interaction. The interaction pre-processing component 134 may index the extracted information such as word/phrase detection and entity recognition in an enhanced interactions index 146. The pre-processing component 134 may also include metadata association to the processed interaction and categorization of the processed interaction. The interaction pre-processing component 134 may store the associated metadata and the categorization product in an interaction database 148.

Interaction chain reconstruction component 150 may determine a list of interactions that are likely to be part of the swap deal interaction chain. The list of interactions is determined based on the information that is extracted and indexed by the pre-processing component 134 and indexed in the enhanced interactions index 146. The Interaction chain reconstruction component 150 may also determine the list of interactions based on the associated metadata and the interaction categorization performed by the pre-processing component 134 and stored in the interaction database 148.

The output of the Interaction chain reconstruction component 150 may be transferred to interaction chain determination application 152. The interaction chain determination application 152 is an application that provides a display of the list of interactions that are likely to be part of a swap deal interaction chain. The interaction chain determination application 152 enables a user to playback any audio interaction on the list of interactions that are likely to be part of a swap deal interaction chain or view any textual interaction on the list of interactions that are likely to be part of a swap deal interaction chain.

In addition, the interaction chain determination application 152 enables the user to associate or disassociate any interaction on the said list with the swap deal interaction chain. In addition, the application provides a display of all of the interactions that are associated with the swap deal interaction chain. The associated interactions may be displayed in a timely manner. The interaction chain determination application enables the user to playback any associated audio interaction and view any associated textual interaction.

The output of the interaction chain reconstruction component 150 may also be transferred to the interaction chain storage module 154. The stored output may be the list of interactions that are likely to be part of the swap deal interaction chain, determined by the interaction chain reconstruction component 150 and/or the interactions that are associated with the swap deal interaction chain. The stored data may also contain any metadata and extracted data that is associated with the interactions and with the swap deal interaction chain.

The output of the Interaction chain reconstruction component 150 may also be transferred to the interaction chain search module 156 configured to enable the search for interaction chains that were previously reconstructed. The search for interaction chains may be based on any metadata and extracted data that is associated with the interactions that are associated with the interaction chain. The search for interaction chains may also be based on any data that is associated with the swap deal interaction chain The system 100 may include one or more computing platforms, executing components for carrying out the disclosed steps. The system 100 may be or may include a general purpose computer such as a personal computer, a mainframe computer, or any other type of computing platform that may be provisioned with a memory device (not shown), a CPU or microprocessor device, and several I/O ports (not shown).

The system 100 may include one or more collections of computer instructions, such as libraries, executables, modules, or the like, programmed in any programming language such as C, C++. C#, Java or other programming languages, and/or developed under any development environment, such as .Net, J2EE or others.

Alternatively, methods described herein may be implemented as firmware ported for a specific processor such as digital signal processor (DSP) or microcontrollers, or may be implemented as hardware or configurable hardware such as field programmable gate array (FPGA) or application specific integrated circuit (ASIC). The software components may be executed on one platform or on multiple platforms wherein data may be transferred from one computing platform to another via a communication channel, such as the Internet, Intranet, Local area network (LAN), wide area network (WAN), or via a device such as CD-ROM, disk on key, portable disk or others.

Figure 2:
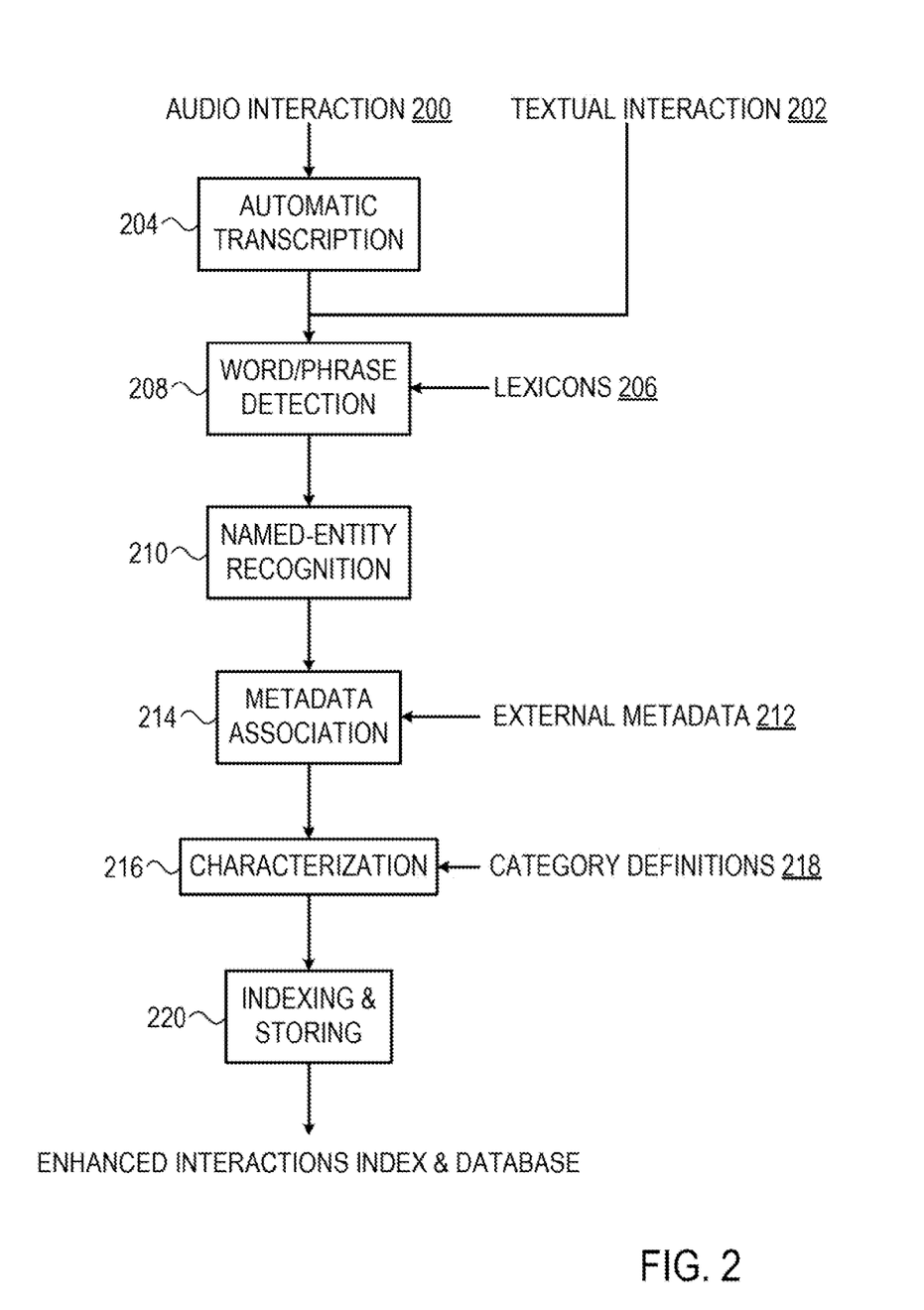
FIG. 2 shows a method for interaction pre-processing, categorizing, indexing and storing, according to exemplary embodiments of the disclosed subject matter.

Reference is made to FIG. 2 which shows a method for interaction pre-processing, categorizing, indexing and storing, according to exemplary embodiments of the disclosed subject matter.

Audio interaction 200 is a digital representation of an audio interaction. The digital representation was captured by the capturing/logging module 132 of FIG. 1.

Textual interaction 202 is a digital representation of textual interaction that was captured by the capturing/logging module 132 of FIG. 1. The textual interaction may be of the types: email, chat, instant messaging session, SMS social media or other textual correspondence. Each captured audio interaction or textual interaction is associated with a unique interaction identifier that is referred to herein as interaction ID.

Step 204 discloses automatically transcribing the digital representation of the audio interaction into a textual transcript by a speech to text algorithm, for example, by an Large Vocabulary Continuous Speech Recognition (LVCSR) algorithm. The transcription of the audio interaction may be stored in in any permanent storage, such as storage device 142.

Lexicons 206 include a plurality of lists of words and/or phrases. Typically each list includes words and/or phrases that may be part of a specific category or theme. For example, lexicons 206 may include a list of words or phrases that indicate deal negotiation, a list of words or phrases that indicate deal execution or a list of words or phrases that indicate a SWAP deal.

Step 208 discloses the detection of words and/or phrases in the transcribed audio interaction or the textual interaction. At this step the words and/or phrases that are included in lexicons 206 are searched in the transcribed audio interaction or the textual interaction. The detected words or phrases in the audio interaction or the textual interaction are locally stored along with their ordinal location in the text. In addition, in case that the searched interaction is an audio interaction, the time in milliseconds from the beginning of the interaction is also locally stored. It should be understood to a person skilled in the art that the step and operation indicated at step 208 may be performed using proprietary tools, or any other external or commercial tools, such as dtsearch engine manufactured by dtsearch (http://www.dtsearch.com/) or Active Intelligence Engine® by Attivio (www.attivio.com).

Step 210 discloses entity extraction on the transcribed audio interaction or the textual interaction. At this step, named entities in the transcribed audio interaction or the textual interaction such as persons, organizations, locations, quantities, times, monetary values, etc. may be recognized. Each recognized named entity in the audio interaction or the textual interaction is locally stored along with its entity type and its ordinal location in the text. It should be understood to a person skilled in the art that the step and operation indicated at step 210 may be performed using proprietary tools, or any other external or commercial tools, such as LinguistxPlatform™ manufactured by SAP or Active Intelligence Engine® by Attivio (www.attivio.com).

External metadata 212 may include trade related data such as: trader ID, counter party ID, order ID, execution ID, SWAP ID, etc. The trade related data may be obtained from various sources such as order systems, trader desktops, counter party databases and the like.

Step 214 discloses metadata association, in which the obtained external metadata 212 is associated with the interaction.

Step 216 discloses interaction categorization process, in which the interaction may be categorized to categories such as: "deal negotiation", "deal execution", "SWAP deal" and the like. The categorization process may be based on words and/or phrases that are detected at step 208 and/or entities that are extracted at step 210 and/or external data that is obtained at step 212 and associated with the interaction at step 214. In some embodiments, the categorization process may be based on predefined rule based category definitions. For example, category definitions 218 may include a predefined lexicon and a predefined list of entities that may be part of a specific category or theme. In addition, category definitions 218 may include a list of metadata parameters that their associated values may enhance the probability to categorize an interaction to a specific category. For example, in case the metadata parameter "execution ID" is not assigned with a value, it may indicate that the interaction associated with the metadata parameter is less likely to be categorized "deal execution" and vice versa. An interaction category score is determined for each category. Each determined interaction category score is associated with the interaction. The determined interaction category score represents the relevance of the interaction to the category. The said score may be in the range of 0 to 100 were 0 represents low relevance of the interaction to the category and 100 represents high relevance of the interaction to the category. For example, the following function may be used for category scoring of an interaction:

$$\text{Category score} = 100 * \left(1 - a * \log_2\left(1 + \frac{1}{\sum_{i=0}^{N-1} W_i + \sum_{i=0}^{M-1} E_i + \sum_{i=0}^{L-1} MD_i}\right)\right)$$

$$W_i = \begin{cases} 1 & \text{if } i\text{-th word detected} \\ 0 & \text{otherwise} \end{cases}$$

$$E_i = \begin{cases} 1 & \text{if } i\text{-th entity detected} \\ 0 & \text{otherwise} \end{cases}$$

$$MD_i = \begin{cases} 1 & \text{if } i\text{-th metadata detected} \\ 0 & \text{otherwise} \end{cases}$$

Where:
N represents the number of words in the category lexicon;
$W_i$ may represent a binary parameter that represents the detection of the i-th word or phrase within the interaction; $W_i=1$ if the i-th word is detected and $W_i=0$ otherwise;
M represents the number of entities in the category definition predefined list of entities.
$E_i$ may represent a binary parameter that represents the detection of the i-th entity within the interaction; $E_i=1$ if the i-th entity is detected and $E_i=0$ otherwise;
L may represent the number of entities within the category definition;
$MD_i$ may represent a binary parameter that represents the detection of the i-th metadata parameter within the category definition; $L_i=1$ if the i-th entity is detected and $L_i=0$ otherwise; and
a may represent a predetermined constant (may be 0.35 by default, or may be empirically determined through statistical experiments. Other values may be also used.):
For example, assuming that 2 words and 1 entity were detected within the interaction and in addition one metadata value that is relevant to the category was associated with the interaction. Then the category score may be calculated as follows:

$$\text{Category score} = 100 * \left(1 - 0.35 * \log_2\left(1 + \frac{1}{2+1+1}\right)\right) \approx 88.5$$

Step 220 discloses indexing & storing detected words and/or phrase as well as named entities recognized in the transcribed audio interactions or in the textual interactions. At this step each detected word or phrase in the audio interaction or the textual interaction is indexed along with its ordinal location in the text. In case that the processed interaction is an audio interaction, the time from the beginning of the interaction is also indexed. In addition, each recognized named entity in the audio interaction or the textual interaction may also be indexed along with its entity type and its ordinal location in the text. The index is stored in any permanent storage, such as storage device 142 of FIG. 1. Step 220 may also include storing the external metadata that is associated with the interaction and the category scores that are associated with the interaction. The external metadata and the category scores may be stored in any permanent storage, such as storage device 142 of FIG. 1. In addition at this step, in case that the interaction is an audio interaction, the transcription of the audio interaction is stored in any permanent storage, such as storage device 142 of FIG. 1.

The following is an example of a trading floor audio interaction, which is a part of a swap deal, going through interaction pre-processing, categorization, indexing and storing processes according to the disclosed exemplary method. According to the disclosed exemplary method, the audio interaction may undergo automatic transcription at automatic transcription step 204. Words and phrases such as "mortgage bundle", "subprime", "interest", "security", "swap deal", "deal closed" and "execution number" may be detected in the transcription at word/phrase detection step 208. In addition, entities such as "AIG" and "fifty million dollars" associated with the entity types "company" and "monetary value", respectively, may be recognized at named-entity recognition step 210. At metadata association step 214, metadata such as trader ID and execution ID may be associated with the interaction. At categorization step 216, the interaction may be associated with a high "SWAP deal" category score. The high "SWAP deal" category score may be generated and associated with the interaction based on the words and phrases: "mortgage bundle", "subprime", "security", "swap deal" that were detected on word/phrase detection step 208. In addition, the entity "AIG" that was detected on named-entity recognition step 210 also contributes to the high score.

At indexing & storing step 220 the detected words and phrases such as "mortgage bundle", "subprime", "interest", "security", "swap deal", "deal closed" and "execution number" and the recognized entities such as "AIG" and "fifty million dollars" along with their entity types are indexed. In addition at this step, the obtained external metadata that is associated with the interaction, such as trader ID and execution ID and the category scores that are associated with the interaction are stored in any permanent storage.

Figure 3A:
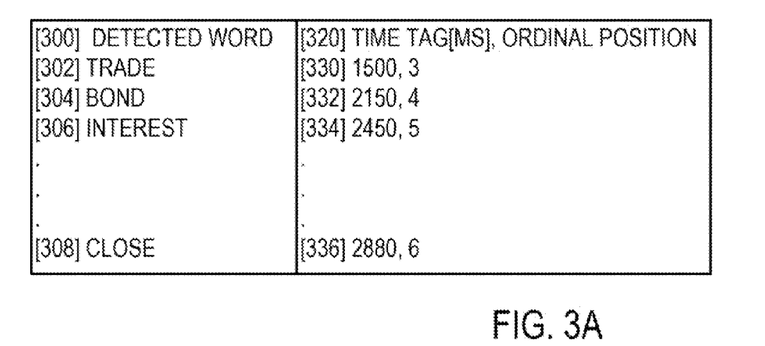
FIG. 3A shows a data structure of the output of the word/phrase detection step according to exemplary embodiments of the disclosed subject matter.

Reference is made to FIG. 3A which shows a data structure of the output of the word/phrase detection step according to exemplary embodiments of the disclosed subject matter. The data structure of the output of the word/phrase detection step may include detected word column 300. The detected word column 300 includes different words that are detected in the audio and/or textual interactions at step 208 of FIG. 2. The detected words are represented by fields 302, 304, 306 and 308. Each one of the fields 302, 304, 306 and 308 represent a different word that appears at least once in the audio and/or textual interaction. Field 320 is the time tag/ordinal location column title. Each of the fields 330, 332, 334 and 336 represent a mapping between a specific detected word and the location of the detected word within the interaction. For example, field 330 represents the location of the detected word 'trade'—represented by field 302. According to field 330, the location of the word 'trade' within the interaction is 1500 milliseconds from the beginning of the interaction and the ordinal word position of the detected word within the interaction is 3 words from the beginning of the interaction.

Figure 3B:
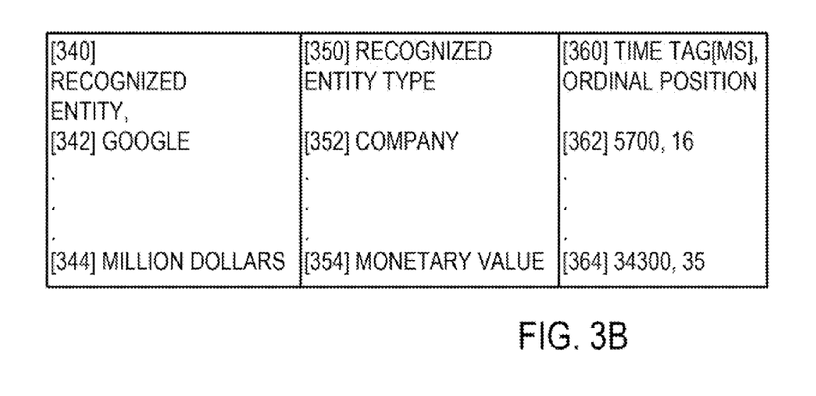
FIG. 3B shows a data structure of the output of the named-entity recognition step according to exemplary embodiments of the disclosed subject matter.

Reference is made to FIG. 3B which is an exemplary illustration of the data structure of the output of the named entity recognition step according to embodiments of the disclosed subject matter. The data structure of the output of the named entity recognition step may include recognized entity column 340. The recognized entity column 340 includes different entities that are recognized in the audio and/or textual interactions at step 210 of FIG. 2. The recognized entities are represented by fields 342, and 344. The fields 342 and 344 represent a different entity that is recognized at least once in the transcription of the audio and/or the textual interaction. The data structure of the output of the named entity recognition step may include recognized entity type column 350. The recognized entity type column includes the entity type of a recognized entity. The recognized entity types are represented by fields 352, and 354. For example the entity type of the recognized entity 'Google', represented by field 342, is 'company', represented by field 352. Field 360 represents the time tag/ordinal location column title. Each of the fields 362 and 364 represent a mapping between a specific recognized entity and its entity type and the location of the recognized entity within the interaction. For example, field 362 represents the location of the recognized entity 'Google'—represented by field 342. According to field 362 the location of the recognized entity 'Google' within the interaction is 5700 milliseconds from the beginning of the interaction and the ordinal word position of the recognized entity within the interaction is 16 words from the beginning of the interaction.

Figure 4:
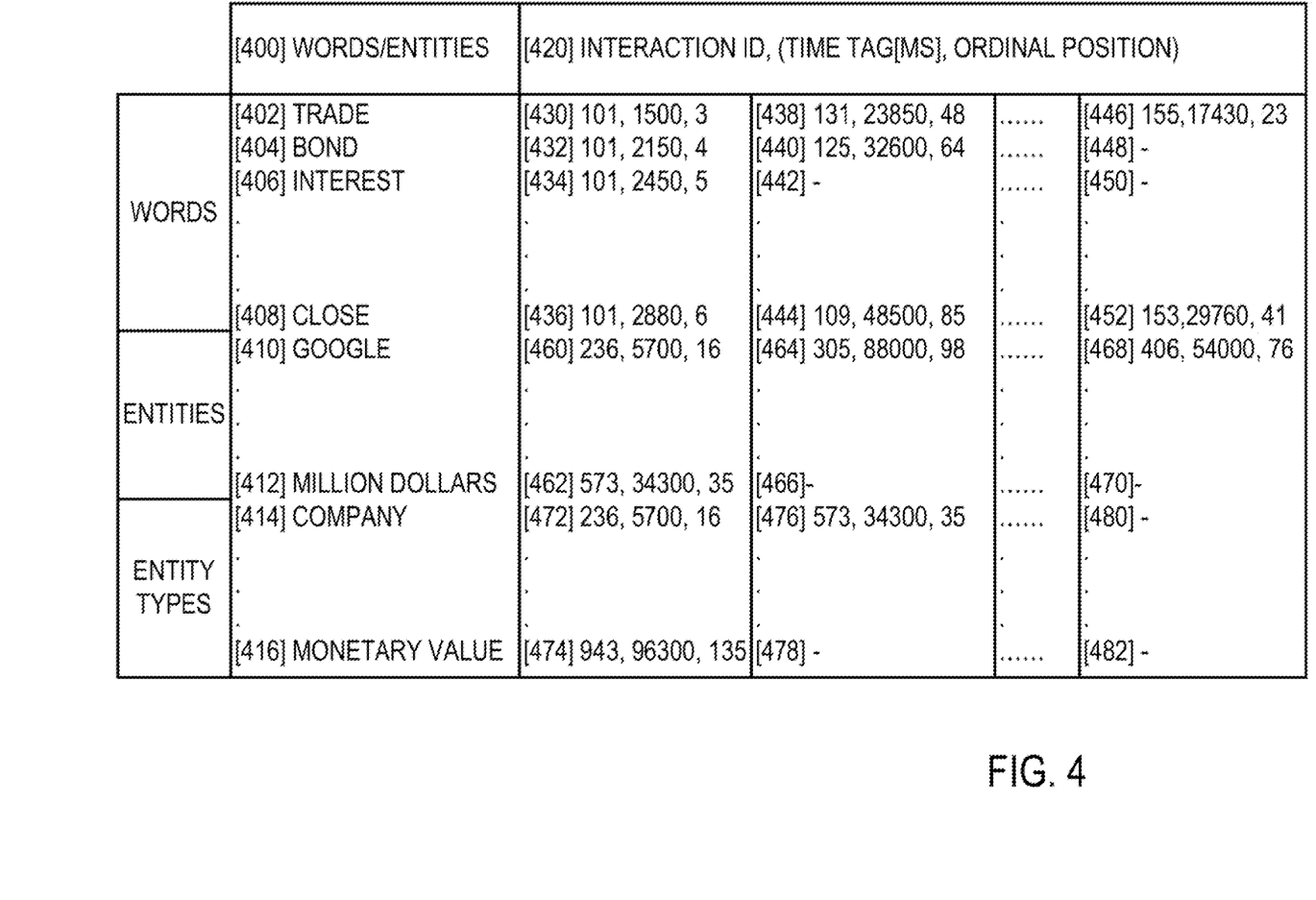
FIG. 4 shows a data structure of the enhanced index according to exemplary embodiments of the disclosed subject matter.

Reference is made to FIG. 4 which shows a data structure of the enhanced index according to exemplary embodiments of the disclosed subject matter. The index is generated and stored at step 220 of FIG. 2. The index data structure may include words/entities column 400. The words/entities column includes all of the different words and entities that are detected in the audio and/or textual interactions at step 208 of FIG. 2. The different words are represented by fields 402, 404, 406 and 408. Each field of the fields 402, 404, 406 and 408 represent a different word that appears at least once in the audio and/or textual interactions. Field 420 is the index columns title. Each of the fields 430, 432, 434, 436, 438, 440, 442, 444, 446, 448, 450 and 452 represent a mapping between a specific word and the audio or textual interaction in which the word was detected and the location of the detected word within the interaction. For example, field 430 represents the detection of the word 'trade'—represented by field 402 in an interaction that is associated with interaction ID 101. In addition, according to field 430, the location of the word 'trade' within the said interaction is 1500 milliseconds from the beginning of the interaction and the ordinal word position of the detected word within the said interaction is 3 words from the beginning of the interaction.

Each of the fields 460, 462, 464, 466, 468, 470, represent a mapping between a specific entity and the audio or textual interaction in which the entity was detected and the location of the detected entity within the interaction. For example, field 360 represents the detection of the entity 'Google'—represented by field 310 in an interaction that is associated with interaction ID 236. In addition, according to field 460 the detected entity's location within the said interaction is 5700 milliseconds from the beginning of the interaction and the ordinal word position of the detected word within the said interaction is 16 words from the beginning of the interaction.

Each of the fields 472, 474, 476, 478, 480, 482, represent a mapping between a specific entity type and the audio or textual interaction in which the entity type was detected and the location of the detected entity type within the interaction. For example, field 472 represents the detection of the entity type 'company'—represented by field 414 in an interaction that is associated with interaction ID 236. In addition, according to field 472 the detected entity type's location within the said interaction is 5700 milliseconds from the beginning of the interaction and the ordinal word position of the detected word within the said interaction is 16 words from the beginning of the interaction.

Figure 5:
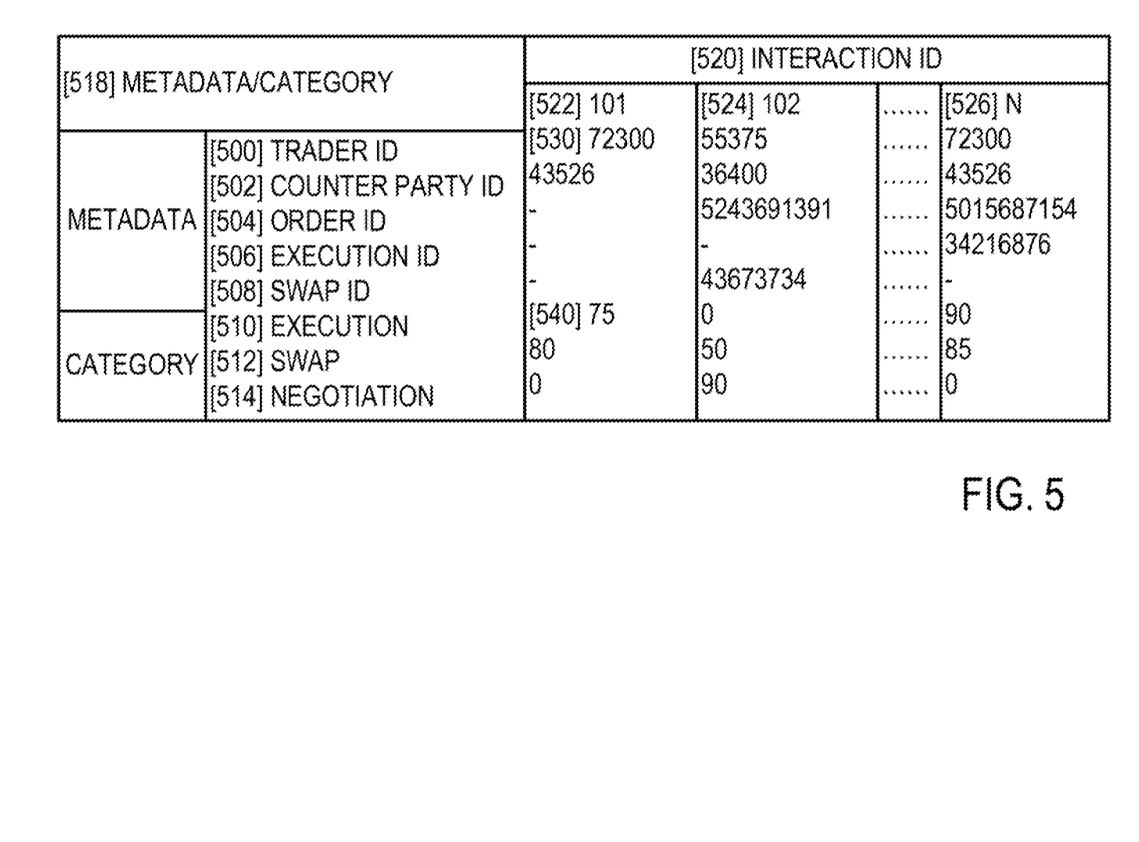
FIG. 5 shows a data structure of the interaction database according to exemplary embodiments of the disclosed subject matter.

Reference is made to FIG. 5 which shows a data structure of the interaction database according to exemplary embodiments of the disclosed subject matter. Data is inserted to the interaction database as disclosed in step 220 of FIG. 2. The interaction database may represent a mapping schema between interactions and their associated metadata. In addition, the interaction database may represent a mapping schema between interactions and category scores. Each of the fields 500-508 may indicate a different metadata parameter that is obtained and associated with audio or textual interactions. For example, field 530 indicates that the trader ID that is associated with interaction ID 101 is 72300. In another example, field 540 indicates that "execution category" score of 75 is associated with interaction ID 101.

Figure 6:
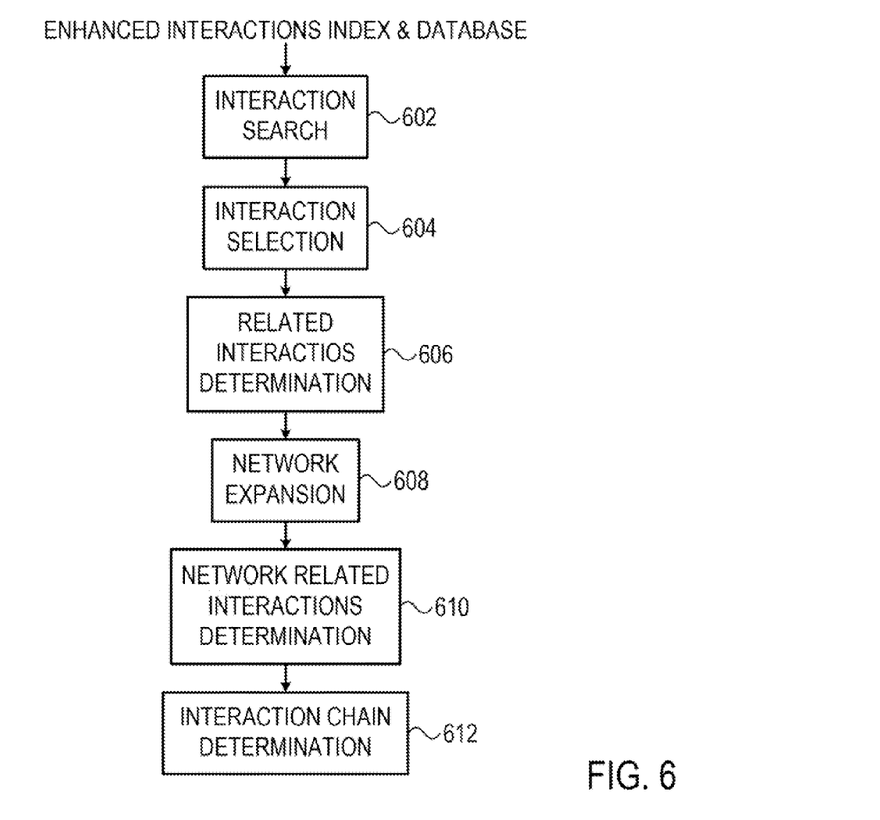
FIG. 6 shows a method for interaction chain reconstruction, according to exemplary embodiments of the disclosed subject matter.

Reference is made to FIG. 6 which shows a method for interaction chain reconstruction, according to exemplary embodiments of the disclosed subject matter.

Step 602 discloses anchor interaction search, in which an audio or textual interaction is searched by a user. The interaction is searched in the enhanced interactions index & database that was disclosed at step 220 of FIG. 2. A user generated query expression may be used for searching the interaction. The query expression may include search criteria and logical operators such as 'OR' or 'AND' between each criterion. The search criteria that are used for interaction search may include words or phrases that are detected at step 208 and indexed at step 220 of FIG. 2. The search criteria may also include named entities such as persons or companies that are detected at step 210 and indexed at step 220 of FIG. 2. The search criteria may also include interaction metadata such as interaction recording/capturing date and time or ID of one of the participants that is associated with the interaction at step 214 of FIG. 2. In addition, the search criteria may also include the interaction category scores that are determined at step 216 and stored at step 220 of FIG. 2. For example, a user may search for an interaction according to its recording date and time and specific words that are detected within the interaction and specific category score that is associated with the interaction. The product of the interaction search is a list of interactions where each interaction on the list is associated with its relevance score to the query expression.

Step 604 discloses anchor interaction selection, in which an interaction is manually selected based on its relevance to a specific swap deal. The list of interactions may be sorted by interaction relevance score to the query expression. The list of interactions that is produced on anchor interaction selection step 602 may be displayed. In some embodiments, the interaction selection may be performed by a human user that may listen to the audio interactions or read the textual interactions on the interactions list. The human user may decide to select an interaction upon evidencing expressions that associate the interaction as being part of a specific swap deal. In other embodiments, the interaction selection may be performed automatically, for example by automatic selection of the top scored interaction on the list.

Step 606 discloses related interactions determination, in which unique identifiers of the participants of the selected interaction are extracted. The participant's unique identifiers are extracted from the metadata associated with the selected interaction. Next, a first list of a plurality of interactions that were held between the participants of the selected interaction is set. The list of the plurality of interactions may be filtered also according to metadata parameters such as recording/capturing date and time, order ID, execution ID, SWAP ID, etc. For example, the list of plurality of interactions may include interactions that involve the same participants of the selected interaction and that their recording/capturing date is between 30 days prior to the recording/capturing time of the selected interaction and 30 days after the recording/capturing time of the selected interaction. The filtered list of the plurality of interactions is referred to herein as first interactions list.

Next, the method discloses retrieving textual interactions or transcriptions of the audio interactions that are on the first interactions list. The transcriptions of the audio interactions and/or the textual interactions may be retrieved from the storage 142 of FIG. 1. The retrieved transcriptions of the audio interactions and/or the retrieved textual interactions are referred to herein as first corpus.

Next, a subset of the first corpus is determined. The subset is determined according to its relevance to the selected interaction. The subset of the first corpus is referred to herein as first corpus subset.

In some embodiments, the first corpus subset may be determined by determining a relevance score for each interaction of the first corpus and selecting the top scored interactions. In other embodiments, the first corpus subset may be determined by comparing the determined relevance score against a predefined threshold.

The relevance scores may be determined by determining a similarity measure function value between the features of each interaction of the first corpus and the features of the selected interaction. In some embodiments, the features may include the frequency list of words or phrases extracted from the text of the interaction and/or the frequency list of entities recognized in the text of the interaction and/or the category scores and the like. The determined relevance score is associated with each interaction of the first corpus subset. The following similarity measure function is an exemplary function that may be used for relevance determination, other formulas may be used:

$$Sim_i = \left| \frac{V_i^\alpha * V_{selected}}{\|V_i^\alpha\| * \|V_{selected}\|} \right|$$

Wherein i may represent the i-th interaction of the first interactions list;

$V_i^\alpha$ may represent the frequency list of words extracted from the text of the i-th interaction of the first interactions list. Wherein a frequency list is a list of words along with their number of occurrences in a the text; and $V_{selected}$ may represent the frequency list of words extracted from the text of the selected interaction.

It should be noted that the similarity measure function may also include phrase frequencies, entity frequencies or other parameters, such as categorization scores, metadata parameters, etc.

Step 608 discloses network expansion, in which a second list of plurality of interactions that include one or more of the participants of the selected interaction is assembled. The second list of plurality of interactions may be assembled by querying the interaction database that is populated on step 220 of FIG. 2. An example of the interaction database structure is illustrated in FIG. 4. For example, the query may include retrieving the list of all interactions that are associated with a specific trader ID, as the said specific trader ID represents a specific trader that is one of the participants of the selected interaction, the second list of plurality of interactions may be filtered also according to metadata parameters such as recording/capturing date and time, order ID, execution ID, SWAP ID, etc. For example, the second list of plurality of interactions may include interactions that involve one of the participants of the selected interaction and that their recording/capturing date is between 30 days prior to the recording/capturing time of the selected interaction and 30 days after the recording/capturing time of the selected interaction. The second filtered list of the plurality of interactions is referred to herein as second interactions list.

Next, the transcriptions of the audio interactions that are on the second interactions list and/or the textual interactions that are on the second interactions list are retrieved. The transcription of the audio interactions and/or the textual interactions may be retrieved from the storage 142 of FIG. 1. The retrieved transcriptions of the audio interactions and/or the retrieved textual interactions are referred to herein as second corpus.

Step 610 discloses network related interactions determination, in which a second corpus subset is determined. The subset of interactions of the second corpus is determined according to the relevance of the interactions of the second corpus to the interactions of the first corpus subset. In some embodiments, the second corpus subset is determined by determining a relevance score for each interaction of the second corpus and selecting the top scored interactions. In other embodiments, the second corpus subset may be determined by comparing the determined relevance score against a predefined threshold.

The relevance scores may be determined according to a similarity measure function value between the features of each interaction of the second corpus and the mean of the features of the first corpus subset. In some embodiments, the features may include but are not limited to the frequency list of words or phrases extracted from the text of the interaction and/or the frequency list of entities recognized in the text of the interaction and/or the category scores. The determined relevance score is associated with each interaction of the second corpus subset. The following similarity measure function is an exemplary function that may be used for relevance determination, other formulas may be used:

$$Sim_i = \left| \frac{V_i^\beta * V_{first\ subset}}{\|V_i^\beta\| * \|V_{first\ subset}\|} \right|$$

Wherein i may represent the i-th interaction of the first interactions list;

$V_i^\beta$ may represent the frequency list of words extracted from the text of the i-th interaction of the second interactions list; and $V_{first\ subset}$ may represent the list of mean frequencies of words extracted from the texts of the first corpus subset. A list of mean frequencies of words is a list of words with their mean number of occurrences in a collection of texts. It should be noted that the similarity measure function may include in addition to word frequencies and mean frequencies of words also phrase frequencies, mean frequencies of phrases, entity frequencies, mean frequencies of entities, categorization scores, mean categorization scores and the like.

Step 612 discloses interaction chain determination, in which a third list of interactions is assembled. The third list of interactions includes interactions that are likely to be part of the swap deal interaction chain. The third list of interactions is assembled from the combination of the first corpus subset and the second corpus subset.

Each interaction on the third list of interactions is associated with a score. The score may be a similarity score associated with the interaction in the first corpus subset or the second corpus subset. The score may also be a variation of the said similarity score. For example the score may be boosted as a function of the number of participants of the selected interaction or the score may be a function of the difference between the recording/capturing time of the selected interaction and the recording/capturing time of the interaction.

Next, after scores association, the third list of interactions, sorted by interaction score, may be displayed. Upon displaying the third list of interactions, one or more interactions out of the third list may be selected. In some embodiments, the interaction selection may be performed by a human user that may listen to the audio interactions or read the textual interactions on the third list of interactions. The human user may decide to select one or more interactions upon evidencing expressions that associate the interaction as being part of the specific swap deal. Each selected interaction is associated with the specific swap deal. In other embodiments, the interactions selection may be performed automatically, for example by automatic selection of the top scored interactions on the third list of interactions.

Figure 7:
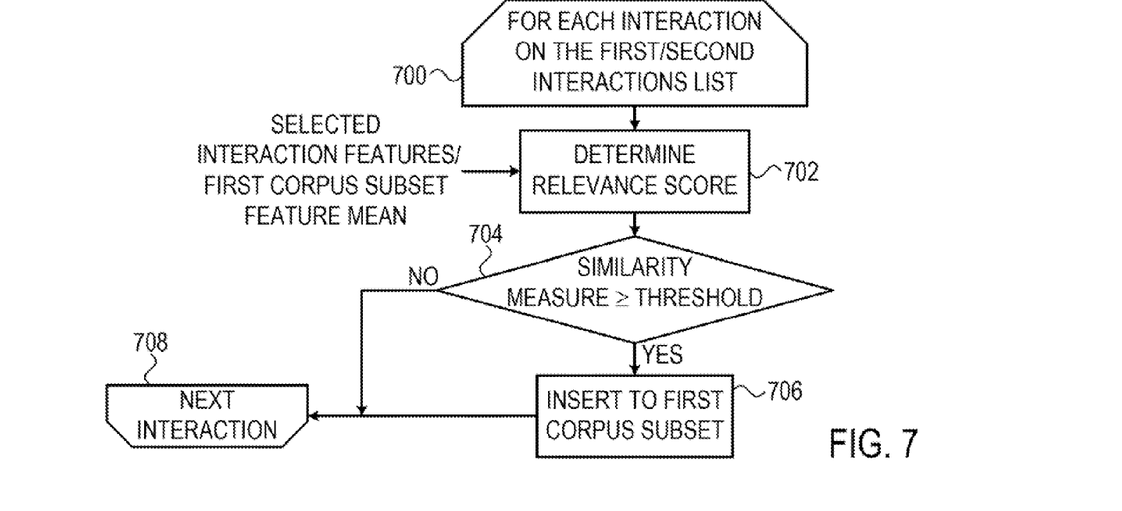
FIG. 7 shows a method for related interactions determination, according to exemplary embodiments of the disclosed subject matter.

Reference is made to FIG. 7 which shows a method for related interactions determination, according to exemplary embodiments of the disclosed subject matter. FIG. 7 may represent related interactions determination as indicated at step 606 of FIG. 6. FIG. 7 may also represent network related interactions determination as indicated at step 610 of FIG. 6.

As indicated at step 700, the process is performed for each interaction on the first or second interactions list. The first interactions list is determined at step 606 of FIG. 6. The second interactions list is determined at step 608 of FIG. 6.

Step 702 discloses determining a relevance score associated with the interaction. The relevance score is determined by measuring the similarity between the features of the processed interaction and the selected interaction features or the mean of the first corpus subset features. In some embodiments the features may include the frequency of words or phrases extracted from the text of the interaction and/or the mean frequency of words or phrases extracted from texts of interactions and/or the frequency of recognized entities in the text of the interaction and/or the mean frequency of recognized entities in texts of interactions and/or the category scores of the interaction and/or the mean category scores of interactions. The similarity measure value may be determined by using the similarity measure function disclosed at step 606 of FIG. 6 or the similarity measure function disclosed on step 610 at FIG. 6. The similarity measure value is in the range of zero to one.

Step 704 discloses comparing the similarity measure value associated with the interaction to a predefined threshold. A typical value of the predefined threshold may be 0.75. Higher predefined threshold values yield less results but with higher similarity accuracy. If the associated similarity measure value is higher than the threshold then, as indicated at step 706, the interaction is added to the first/second corpus subset. If the associated similarity measure value is lower than the threshold then, the interaction is discarded.

As indicated at step 708, the process repeats for every interaction on the first/second interactions list.

Figure 8:
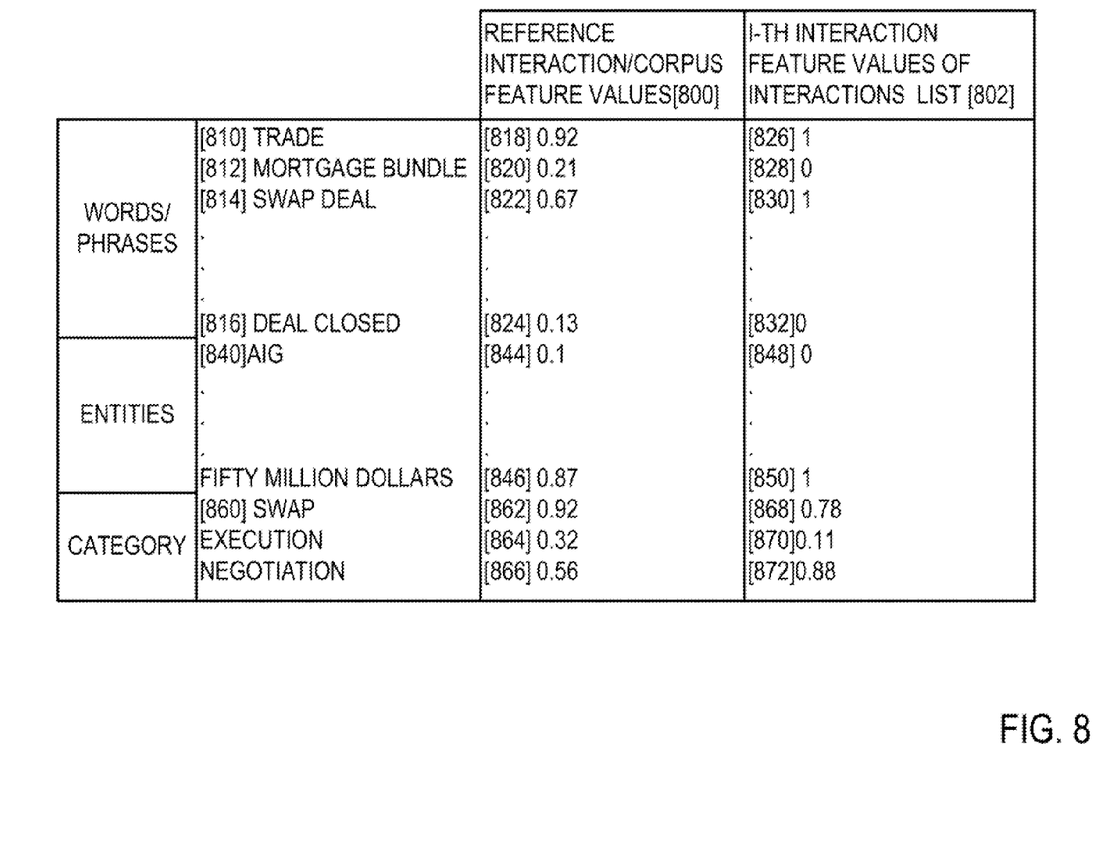
FIG. 8 shows a data structure of similarity measure function input according to exemplary embodiments of the disclosed subject matter.

Reference is made to FIG. 8 which shows an exemplary illustration of the similarity measure function input data structure according to embodiments of the disclosed subject matter. FIG. 8 may represent similarity measure function input data structure that is generated as part of related interactions determination step 606 of FIG. 6 and network related interactions determination step 610 of FIG. 6.

Reference interaction/corpus 800 may represent the feature values that are extracted from the selected interaction at step 606 of FIG. 6. The features may include but are not limited to the frequency list of words or phrases extracted from the text of the interaction and/or the frequency list of entities recognized in the text of the interaction and/or the category scores and the like.

Reference interaction/corpus 800 may also represent the mean of the features that are extracted from the first corpus subset. The first corpus subset is determined at step 606 of FIG. 6. The features may include but are not limited to the frequency list of words or phrases extracted from the text of the interaction and/or the frequency list of entities recognized in the text of the interaction and/or the category scores and the like.

The different word/phrases feature values are represented by fields 810, 812, 814 and 816. Each of the fields 818, 820, 822 and 824 may represent a mapping between the frequency of a word or phrase and the selected interaction. Fields 810, 812, 814 and 816 may also represent a mapping between the mean frequency of a word or phrase and the first corpus subset. Each of the fields 826, 828, 830 and 832 may represent a mapping between the frequency of a word or phrase and the i-th interaction. The i-th interaction is the interaction that the relevance score is determined for at step 702 of FIG. 7.

For example, the phrase "swap deal" represented by field 814 has a mean frequency of 0.67 in the first corpus subset, represented by field 822, and a frequency of 1 in the i-th interaction of the second corpus represented by field 830.

Fields 844 and 846 may represent a mapping between the frequency of a recognized entity and the selected interaction. Those fields may also represent a mapping between the mean frequency of a recognized entity and the first corpus subset. Fields 848 and 850 may represent a mapping between the frequency of a recognized entity and the selected interaction the i-th interaction. For example, the recognized entity "AIG" represented by field 840 has a mean frequency of 0.1 in the first corpus subset, represented by field 844, and a frequency of 0 in the i-th interaction of the second corpus represented by field 848.

Each of the fields 862, 864 and 866 may represent a mapping between a category score and the selected interaction. Those fields may also represent a mapping between the mean category score and the first corpus subset.

For example, a mean score of 0.92 in the "SWAP category", represented by field 862, was determined for the first corpus subset. And a score 0.78 of in the "SWAP category", represented by field 868, was determined for the i-th interaction.

Figure 9:
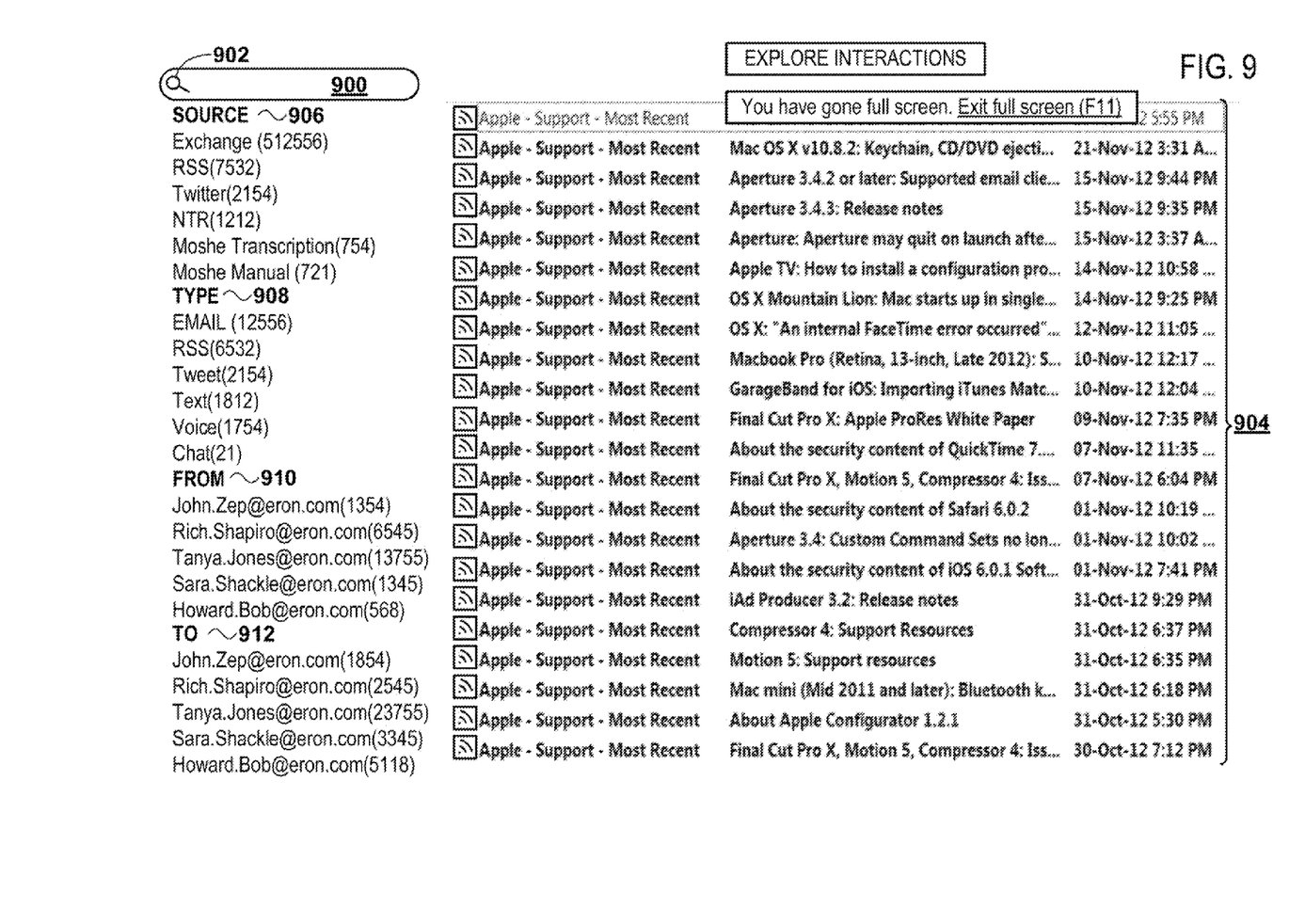
FIG. 9 shows a display application of interaction search results according to exemplary embodiments of the disclosed subject matter.

Reference is made to FIG. 9 which shows an exemplary illustration of an application for displaying interaction search results according to embodiments of the disclosed subject matter. FIG. 9 may represent search results display generated upon executing a user generated query expression. The displayed search results is a list of interactions which is the output of anchor interaction search step 602 of FIG. 6.

Field 900 represents a text box that is used by a user for entering a user generated query expression.

Field 902 is a search execution icon that is used for executing the search according to the user generated query expression.

Field 904 represents the list of interactions that are the results of search according to the user generated query expression.

The search is performed on a search corpus. The search corpus resides in the enhanced interactions index & database that were populated at step 220 of FIG. 2. Each of the fields 906, 908, 910 and 912 represent a different metadata type regarding the searched corpus. Field 906 represents the different information sources that constitute the search corpus and the number of interactions in the search corpus per information source. Field 908 represents the type of interactions that constitute the search corpus and the number of interactions in the search corpus per each type. The type of interaction may be email, twit, voice, chat and the like. Fields 910 and 912 represent information regarding the participants of the interactions on the search corpus. The information regarding the participants may be email address, trader ID, counter party ID or the like.

Figure 10:
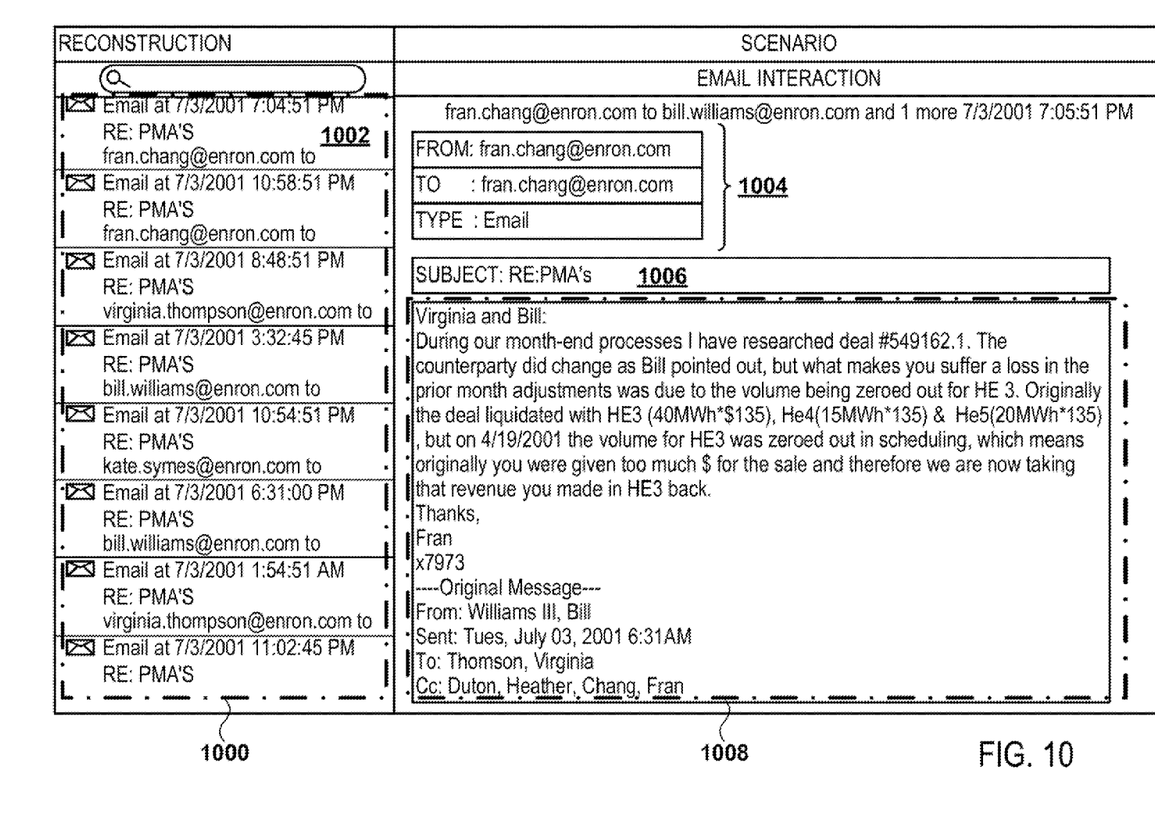
FIG. 10 shows a display application of the third list of interactions according to exemplary embodiments of the disclosed subject matter.

Reference is made to FIG. 10 which shows an exemplary illustration of an application for displaying the third list of interactions according to embodiments of the disclosed subject matter. The third list of interactions includes interactions that are likely to be part of the swap deal interaction chain. The third list of interactions is generated at step 612 of FIG. 6. Using the illustrated application, a user is able to examine each interaction on the third list of interactions. An examination of an audio interaction may be performed by playing it back. An examination of a textual interaction may be performed by displaying it. Item 1000 represents the display of the third list of interactions. Field 1002 represents the first interaction on the third list of interactions. Upon clicking on an interaction from display of the third list of interactions, the interaction metadata and content is displayed. For example, upon clicking the first interaction on the third list of interactions, represented by field 1002, the interactions metadata such as "from", "to" and "type" is displayed. Field 1004 represents the interaction metadata display. In addition, the subject of the interaction and the content of the interaction, represented by fields 1006 and 1008 respectively, are displayed.

Reference is made to FIG. 11 which shows an exemplary illustration of an application for interaction chain determination according to embodiments of the disclosed subject matter. Interaction chain determination is performed at step 612 of FIG. 6. Item 1100 represents the display of the third list of interactions. The third list of interactions includes interactions that are likely to be part of the swap deal interaction chain. Using the illustrated application, a user is able to examine each interaction on the third list of interactions. An examination of an audio interaction may be performed by playing it back. An examination of a textual interaction may be performed by displaying it. Playback and display of an interaction is performed by using buttons 1102. After the examination of the interaction, the user may decide to add an interaction to the interaction chain. Adding an interaction to the interaction chain is performed by right clicking on the interaction that is displayed on the third list of interactions. Upon right clicking the interaction, a star icon appears on the right of the interaction. Another right click removes the interaction from the interaction chain and the star icon disappears. For example, the star, labeled 1103 represent that interaction 1104 is determined by the user to be part of the swap deal interaction chain.

Labels 1104, 1106, 1108 and 1110 represent interactions that are determined by the user to belong to the same interaction chain. The user is able to sequentially playback/display all of the interactions that compose the interaction chain. The playback/display is performed by clicking buttons 1102. The display may present all or some of the interactions that compose the interaction chain in a single view, represented by field 1112.

What is claimed is:

1. A method for trade interaction chain reconstruction, comprising:

receiving audio interactions and text interactions by a computerized system executed on one or more general purpose computers;

pre-processing the interactions by extracting words from the audio interactions and metadata from the audio interactions and the text interactions; wherein the metadata includes an order ID, an execution ID or a swap deal ID;

storing the pre-processed interactions and results of the pre-processing in a storage device;

querying the storage device with an expression to identify a swap deal, the swap deal includes two or more of the received interactions and involves two or more participants;

assigning a relevance score of each interaction to the query expression;

sorting the interactions by the relevance score;

automatically selecting from the storage device based on the relevance score a first interaction of the received interactions, said first interaction involves at least two participants of the two or more participants;

obtaining a first plurality of interactions of the received interactions that involve the at least two participants of the two or more participants;

filtering the obtained first plurality of interactions based on metadata parameters;

determining a first plurality of relevance scores between the first plurality of interactions and the first interaction; and associating interactions of the first plurality of interactions to be relevant to the swap deal according to the determined first plurality of relevance scores     outputting to a chain storage module a potential list of interactions that were determined to be relevant to the swap deal;

wherein the preprocessing comprises:
automatically transcribing the received audio interactions;
extracting words, phrases and named entities from the received interactions;
associating metadata to the receive interactions;
categorizing the received interaction into categories;
wherein the named entities include names of people, names of organizations or names of locations; and
wherein the categories are identified by assigning a category score that is a function of a log of one plus the inverse of the sum of the number of extracted words, extracted named entities and extracted metadata or a specific interaction.

2. The method according to claim 1, wherein the received interactions are textual interactions.

3. The method according to claim 1, wherein the received interactions are audio interactions.

4. The method according to claim 1, wherein the first plurality of interactions that involve the at least two participants are obtained according to a predetermined set or rules.

5. The method according to claim 1, further comprises ranking the first plurality of interactions according to the first plurality of relevance scores.

6. The method according to claim 5, wherein the first plurality of relevance scores are determined based on a first similarity measure function between the first interaction and the first plurality of interactions.

7. The method according to claim 6, wherein the first similarity measure function is based on parameters selected from a group consisting of word frequencies, phrase frequencies, named entities, category scores and associated metadata.

8. The method according to claim 5, further comprises selecting a first portion of interactions of the first plurality of interactions according to the first plurality of relevance scores.

9. The method according to claim 1, further comprises obtaining a second plurality of interactions from the received interactions that involve at least one participant of the two or more participants of the swap deal.

10. The method according to claim 9, further comprises ranking the second plurality of interactions according to a second plurality of relevance scores.

11. The method according to claim 10, wherein the second plurality of relevance scores are determined based on a second similarity measure function between the first portion of interactions of the first plurality of interactions and the second plurality of interactions.

12. The method according to claim 11, wherein the second similarity measure function is based on parameters selected from a group consisting of word frequencies, phrase frequencies, named entities, category scores and associated metadata.

13. The method according to claim 1, further comprises selecting a second portion of interactions of a second plurality of interactions.

14. The method according to claim 13, wherein the second portion of interactions is selected according to a second plurality of relevance scores.

15. The method according to claim 14, further comprises generating the list of potential swap deal interactions by combining the first portion of interactions and the second portion of interactions.

16. The method according to claim 15, further comprises displaying the list of potential swap deal interactions sorted by the first plurality of relevance scores and the second plurality of relevance scores.

17. The method according to claim 16, further comprises enabling playback of audio interactions and enabling display of textual interactions on the list of potential swap deal interactions.

18. The method according to claim 16, further comprises enabling a user to verify the relevance of the displayed interactions to the swap deal.

19. The me according to claim 18, further comprises displaying the verified interactions in a timely manner.

20. The method according to claim 1, wherein the filtering removes interactions that are captured more than a specific number of days after the capturing date of the interaction or prior to the interaction.

21. The method according to claim 1, further comprising displaying the potential list of interactions that were determined to be relevant to the swap deal and enabling a user to associate or disassociate any interaction of the list with the swap deal.

* * * * *